US 8,495,161 B2

(12) United States Patent
Lin (10) Patent No.: US 8,495,161 B2
(45) Date of Patent: Jul. 23, 2013

(54) DUPLICATE MMS CONTENT CHECKING

(75) Inventor: Zhijian Lin, Dublin, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 660 days.

(21) Appl. No.: 12/333,805

(22) Filed: Dec. 12, 2008

(65) Prior Publication Data

US 2010/0153511 A1  Jun. 17, 2010

(51) Int. Cl.
*G06F 15/16* (2006.01)
(52) U.S. Cl.
USPC ............ 709/207; 707/697; 714/E11.04
(58) Field of Classification Search
USPC ............ 709/207; 707/697; 714/E11.04
See application file for complete search history.

(56) References Cited

U.S. PATENT DOCUMENTS

| 7,346,630 | B2 | 3/2008 | Eichstaedt et al. | |
|---|---|---|---|---|
| 7,636,767 | B2* | 12/2009 | Lev-Ran et al. | 709/218 |
| 7,792,121 | B2* | 9/2010 | Thompson et al. | 370/395.4 |
| 8,032,598 | B1* | 10/2011 | He et al. | 709/206 |
| 2002/0006783 | A1* | 1/2002 | Akao et al. | 455/412 |
| 2002/0133477 | A1* | 9/2002 | Abel | 707/1 |
| 2002/0161788 | A1* | 10/2002 | McDonald | 707/203 |
| 2003/0055903 | A1 | 3/2003 | Freed | |
| 2003/0144990 | A1* | 7/2003 | Benelisha et al. | 707/1 |
| 2004/0049500 | A1* | 3/2004 | Donatelli et al. | 707/3 |
| 2006/0004808 | A1* | 1/2006 | Hsu et al. | 707/101 |
| 2006/0186202 | A1 | 8/2006 | Donner | |
| 2006/0248151 | A1* | 11/2006 | Belakovskiy et al. | 709/206 |
| 2007/0097875 | A1* | 5/2007 | Bender et al. | 370/252 |
| 2007/0124415 | A1* | 5/2007 | Lev-Ran et al. | 709/217 |
| 2007/0160062 | A1* | 7/2007 | Morishita et al. | 370/395.31 |
| 2008/0034049 | A1* | 2/2008 | Stokes | 709/206 |
| 2008/0263169 | A1* | 10/2008 | Brabec et al. | 709/206 |
| 2008/0288509 | A1 | 11/2008 | Mysen et al. | |
| 2008/0301007 | A1* | 12/2008 | Horel et al. | 705/27 |

FOREIGN PATENT DOCUMENTS

| EP | 1533706 A1 * | 5/2005 |
|---|---|---|
| EP | 1835674 | 9/2007 |
| JP | 2001066986 A * | 3/2001 |
| WO | WO 9603820 A2 * | 2/1996 |
| WO | WO 2007035652 A2 * | 3/2007 |
| WO | WO 2007081149 A1 * | 7/2007 |

* cited by examiner

Primary Examiner — Wing F Chan
Assistant Examiner — Kostas Katsikis (57) ABSTRACT

A method may include receiving a content message from a content provider at a computing device, the content message including at least one content item to be included in alert messages. The method may further include verifying a content item included in the content message for duplication against a content history by utilizing the computing device, the verifying including: computing an item checksum for the content item; querying the content history for the item checksum; and determining whether the item checksum is a duplicate based on a result returned from the query. The method may further include if the content item is determined not to be a duplicate: matching the content item to an alert template associated with a subscriber, and generating an alert message including the content item based on the alert template.

22 Claims, 5 Drawing Sheets

DUPLICATE MMS CONTENT CHECKING

BACKGROUND

A messaging system may provide an alerting mechanism to subscribers, the alerting mechanism generating alert messages including content provided by at least one content provider. A content provider may inadvertently submit duplicate content to the message alerting system, which could thereby cause duplicate alert messages to be sent to a subscriber. Additionally, a subscriber may also inadvertently sign up for duplicative alert messages, which may also cause duplicate alert messages to be sent to the subscriber. To remedy these situations, a duplicate alert content checking function may be required to protect the subscribers from receiving duplicate alert messages.

DETAILED DESCRIPTION

Figure 1:
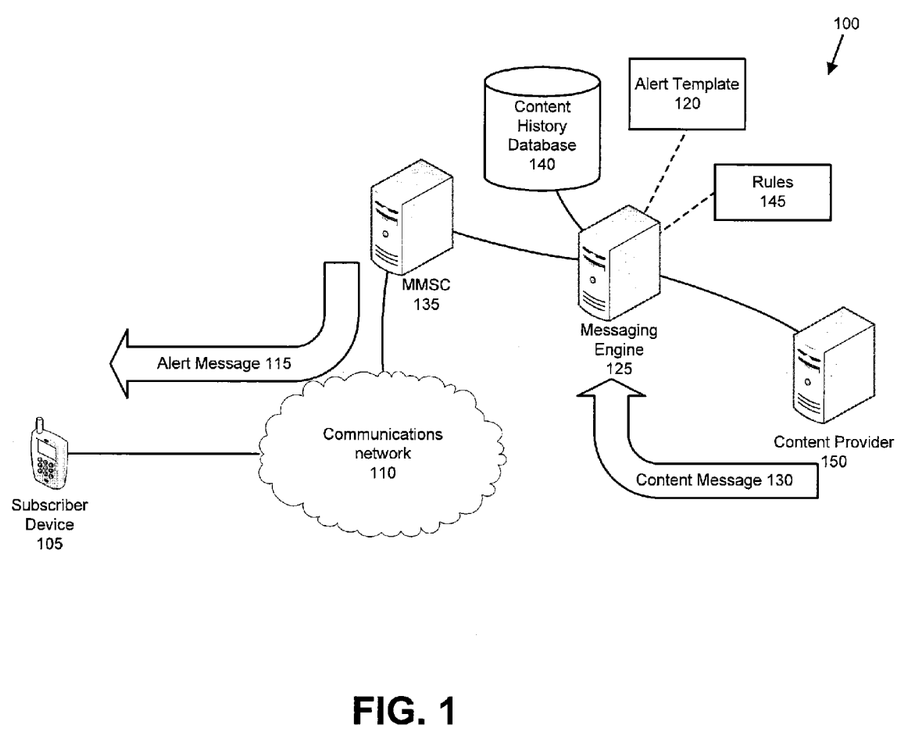
FIG. 1 illustrates an exemplary communications system for the creation of alerts as well as the detection and selective blocking of duplicate alert messages.

FIG. 1 illustrates an exemplary communications system (system) 100 for the creation of alerts as well as the detection and selective blocking of duplicate alert messages. System 100 may take many different forms and include multiple and/or alternate components and facilities. While an exemplary system 100 is shown in FIG. 1, the exemplary components illustrated in the figure are not intended to be limiting. Indeed, additional or alternative components and/or implementations may be used.

A messaging engine 125 may receive a content message 130 from a content provider 150, where the content message 130 may be used to generate alert messages 115, which in turn may be sent to subscriber devices 105. The messaging engine 125 may analyze the received content message 130, and determine based on alert templates 120 and system rules 145 whether to send an alert message 115 to the subscriber device 105. For example, if the received content message 130 matches an alert template 120 associated with a subscriber device 105, the system 100 may send an alert message 115 to the subscriber device 105 in conformance with the alert template 120.

As illustrated in FIG. 1, in an exemplary approach system 100 includes a subscriber device 105. A subscriber device 105 or other communications device (including, but not limited to Plain Old Telephone Service (POTS) telephone, Voice Over Internet Protocol (VOIP) telephone, mobile telephone, "softphone," pager, computer, Set Top Box (STB), etc.) is used by a subscriber to send and receive communications (e.g., voice, text, image, video, binary data, etc.) on a communications network 110 (e.g., Public Switched Telephone Network (PSTN), VOIP, cellular telephone, etc.). Likewise, a communications network 110 may provide communications services, including voice calling, packet-switched network services (such as Internet access and/or VOIP communication services), as well as Short Message Service (SMS) messaging and Multimedia Messaging Service (MMS) messaging services, to at least one subscriber device 105.

SMS messaging is a messaging protocol that typically is used for the sending and receiving of SMS messages to and from devices, including, for example, subscriber device 105. SMS messages may also be sent and received by other devices, including wired devices such as an External Short Message Entity (ESME) and a desktop computer, as is known. An SMS message typically may contain up to 160 7-bit characters (or fewer characters in a larger bit encoding), and may include textual and binary data. Longer messages may be sent through the concatenation of multiple SMS messages.

MMS is a service that may allow a subscriber to send multimedia files (e.g., pictures, movies, slideshows, and other graphical materials) in combination with textual data from one device to another (e.g., subscriber device 105, content provider 150, etc.). A subscriber device 105 configured to receive MMS messages through Wireless Application Protocol (WAP) may receive a notification that an MMS message is available, retrieve the message, and display the message to a subscriber. A subscriber device 105 that is not configured to receive MMS messages through WAP may receive an SMS message notification that an MMS message has arrived, and that the MMS message may be available to be retrieved through another mechanism than WAP, such as via HTTP or e-mail. MMS messages may further be sent to e-mail addresses directly, instead of or in addition to being sent to a subscriber device 105.

MMS content may include files of various types, including but not limited to text files, image files, audio files, and video files. For example, pictures, ring tones, video clips, and textual news stories may all be sent via MMS messaging. MMS content may further include presentation data (i.e. Synchronized Multimedia Integration Language (SMIL), Extensible Hyper Text Markup Language (XHTML), etc.) to allow for multimedia files to be put together or otherwise arranged into presentations.

An alert message 115 is a message that may be sent to a subscriber device 105 to provide the device with information as specified in an alert template 120. An alert template 120 is a template defining information to contain in the alert message 115 as well as a trigger condition which may cause an alert message 115 to be generated. An alert message 115 may be an SMS message, an MMS message, or another type of message including but not limited to a Signaling System 7 message, an e-mail, an instant message from an instant message service such as America Online Instant Messaging Service, a voice message synthesized by an auto-attendant, etc. A subscriber device 105 or other device associated with a subscriber may be used to sign up for an alert message 115 through selection of an alert template 120. An alert template 120 may be associated with multiple subscriber devices 105, and thus an alert message 115 may be generated once and sent to multiple subscriber devices 105.

Alert templates 120 may include a definition of at least one trigger condition to cause the delivery of an alert message 115. For example, an alert template 120 may be configured to trigger at a scheduled time (e.g. a selected day or days of the week, a specified time or times of the day, on a birthday, an anniversary, a holiday, etc.), filtered based on inclusion of a particular keyword in a news item (e.g. news stories including mention of a chosen celebrity), based on a real-time event (e.g. receiving a sports score when additional points are earned, at the conclusion of a period of a sports game, game quarter, game, etc.), or based on a defined event (e.g., on a stock ticker symbol and the movement of the chosen stock into or out of a chosen stock price range).

Alert templates 120 may also include a definition of any information to contain in the alert message 115. In some examples alert templates 120 may be arranged into a topical hierarchy and presented to a subscriber device 105 for selection, where a subscriber device 105 may select an alert template 120 from the hierarchy and thus sign up to receive alert messages 115 for that selected alert topic. Alerts templates may include information in various categories, including, but not limited to Entertainment, News, Sports, Travel & Weather, and the like. Within these categories, some or all alert template 120 topics may be further organized into sub-categories, thus forming a topical hierarchy. For example, an Entertainment category may include subcategories such as Horoscope, Celebrity, Lifestyle, Movies, Music, Gaming, Health, among others. As another example, a Travel & Weather category may have Travel and Weather subcategories, and within the Weather subcategory may be 3-day forecast, current conditions, and severe weather sub-subcategories. Moreover, featured or popular alert templates 120 may also be listed and available or in a prominent location to allow a subscriber device 105 to select the popular alert template 120 without having to locate the specific popular template within the template hierarchy.

A subscriber device 105, such as a mobile telephone subscriber, may be utilized to create, set up, activate, or otherwise associate the subscriber device 105 with at least one alert template 120. For example, a subscriber may use a subscriber device 105 to sign up for alert messages 115 specified by an alert template 120 through a user interface available on the subscriber device 105 or through a web interface. The interface may be used to select and/or input information relating to the alert template 120, including category, content, timing, format, etc. for the alert messages 115. Based on the selected and entered information, as well as on the content message 130 received from at least one content provider 150, at least one alert message 115 may be generated and sent to the subscriber device 105 in conformance with the alert template 120.

In other examples, devices other than subscriber device 105 may be used to sign up subscriber device 105 for alert messages 115. For example, a subscriber device 105 may be signed up for alert messages 115 by a device including, but not limited to, a desktop computer, a laptop computer, a Portable Digital Assistant, a subscriber device 105 other than the one intended to receive the alert message 115, a network device on the communications network 110, and so on.

As mentioned above, alert messages 115 may be generated in conformance with alert templates 120 associated with a subscriber device 105 and may be delivered to the subscriber device 105. A subscriber may explicitly determine that an alert message should be delivered as a particular message type (e.g., SMS message, MMS message, e-mail message, Instant Message, and so on) or implicitly though requesting content more appropriate to one available message format than to another (e.g., picture message, text message). Merely by way of example, textual alerts may be delivered via SMS while picture alerts may be delivered via MMS.

Additionally, the system 100 may determine an appropriate message format in which to deliver an alert message 115, or the type of alert message 115 may be specified by the alert template 120. For example, an alert template 120 may specify to deliver a picture of a weather chart, in which case the system 100 may determine to send the alert message 115 as an MMS message and not an SMS message because image data is capable of being sent through MMS while not through SMS. Alternately, the system 100 may also be configured to send data appropriate to the type of message chosen, such as sending textual data only if an SMS message type is chosen, while sending pictorial data when a format supporting such data is chosen.

For example, a subscriber device 105 may sign up for a 3-day weather forecast for New York City, and for the alert to be delivered at 9:00 AM EST. The subscriber device 105 may sign up for the alert as an SMS message. In such a case the subscriber device 105 would receive the forecast in a textual form. Alternately, the subscriber device 105 may sign up for the weather forecast alert to be delivered as a picture (e.g., as an MMS message). In such a case the user may receive the forecast as an image.

The subscriber device 105 may sign up for any number of alerts. For example, a subscriber device 105 may sign up for a news alert at 9:00 AM, and also for another news alert at 10:00 AM. As another example, a subscriber device 105 may sign up for a weather forecast alert each morning at 9:00 AM, and a news alert at 9:10 AM every weekday morning.

A messaging engine 125 may receive multimedia content within a content message 130. The content message 130 may include multimedia content files in various formats and encoded in various ways, including binary, encapsulated and encoded as text such as Multipurpose Internet Mail Extensions (MIME), etc. Additionally, the messaging engine 125 may extract the multimedia content from the content message 130, and store the content either on the messaging engine 125 or on another network device, such as content history database 140.

The messaging engine 125 may compare the content extracted from the content message 130 with any alert templates 120, including any alert templates 120 the subscriber device 105 is signed up for, along with any rules 145 for the system. The content extracted from the content message 130 may include metadata that may be matched with identifiers in the alert templates 120 and/or with the subscriber device 105, and if matching data is found, then the messaging engine 125 may generate an alert message 115 and send an alert to the subscriber device 105.

A Multimedia Messaging Service Center (MMSC) 135 may be connected to communications network 110, and may perform various functions in relation to MMS messaging. The MMSC 135 may send a control message (such as alert message 115, an SMS message, etc.) to a subscriber device 105 indicating to the subscriber device 105 that an MMS message is available. The control message may typically include a Uniform Resource Locator (URL) specifying the location of the extracted content, such as a location on the communications network 110. The subscriber device 105 may then use a Wireless Application Protocol (WAP) browser, HTML browser or other mechanism to retrieve the multimedia content from the specified location.

The MMSC 135 typically may include store and forward functionality, in which for example, MMS messages including alert messages 115 that are sent to the MMSC 135 may be sent immediately to a subscriber device 105 or may be kept (e.g. in a message store) and sent to the subscriber device 105 at a later time when the subscriber device 105 may be available. Moreover, an alert message 115 may be forwarded to an MMSC 135 acting as a relay, and the MMSC 135 may forwards the alert message 115 to another MMSC 135 if, for example, the destination subscriber device 105 is on a different communications network 110 or otherwise should be served by a different MMSC 135. Only one MMSC 135 is shown in FIG. 1 for clarity.

Returning to the messaging engine 125, the messaging engine 125 may further provide a duplicate alert message 115 content checking function. This function may compute checksums of alert messages 115 or content files, and compare the checksums with stored checksums from previously sent alert messages 115 and received content files, and may determine based on the comparison whether the alert message 115 or content file is a duplicate.

For example, the messaging engine 125 may compute a checksum value based on an alert message 115 generated from an alert template 120. The messaging engine 125 may store this checksum value in a data store (e.g. in content history database 140.) When a second alert message 115 is generated, the messaging engine 125 may compute a checksum for the second alert message 115, and may compare the checksum for the second alert message 115 with stored checksums. If the checksum for the second alert message 115 matches a checksum queried for and determined to be included in the data store, then the messaging engine 125 may determine that the alert message 115 to be a duplicate.

The messaging engine 125 may limit the checksum comparison to stored checksums for alert messages 115 sent to a particular subscriber device 105 (e.g. the device to which the message is indicated to be sent, the subscriber device 105 associated with the alert template 120 used to generate the alert message 115, etc.). If one subscriber device 105 received an alert message 115, in many cases a second subscriber device 105 would still want to receive the same alert message 115 and would not consider the message to be a duplicate. In other cases, for example, if the same subscriber utilizes multiple subscriber devices 105, then an alert message 115 sent to one subscriber device 105 may be considered a duplicate of an alert message 115 sent to a second subscriber device 105 if both alert messages 115 have the same checksum value.

As another example, the messaging engine 125 may compute checksum values for each received content file in a content message 130 received from a content provider 150. The messaging engine 125 may store these checksum values in a data store, such as content history database 140. The messaging engine 125 may receive a second content message 130 and may calculate checksum values for each received content file in the second content message 130. The messaging engine 125 may compare the checksums computed from the content files in the second content message 130 against the checksums stored in the data store such as through performing a database query for the checksums, and may determine if any or all of the content files are duplicates.

The messaging engine 125 may further determine, based on whether a duplicate was found and based on rules 145, additional actions to take. Such actions may include a determination on whether to deliver an alert message 115 to a subscriber device 105 if it is a duplicate, or whether to inform a content provider 150 that duplicate content files were received.

In many examples, the messaging engine 125 is a computing device, including a processor, and storage. A processor (e.g., a microprocessor) receives instructions from storage, e.g., from a computer-readable medium such as a memory, and executes these instructions, thereby performing one or more processes, including one or more of the processes described herein. Such instructions may be stored and transmitted using a variety of known computer-readable media.

In general, computing devices such as messaging engine 125 and MMSC 135 may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of well known computing devices, including, without limitation, a computer workstation, a desktop, notebook, laptop, or handheld computer, or some other known computing device.

Computing devices generally each include instructions executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any tangible medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, a messaging engine 125 may be implemented as computer-readable instructions (e.g., software) on one or more computing devices (e.g., servers, personal computers, etc.), stored on computer readable media associated therewith (e.g., disks, memories, etc.).

Figure 2A:
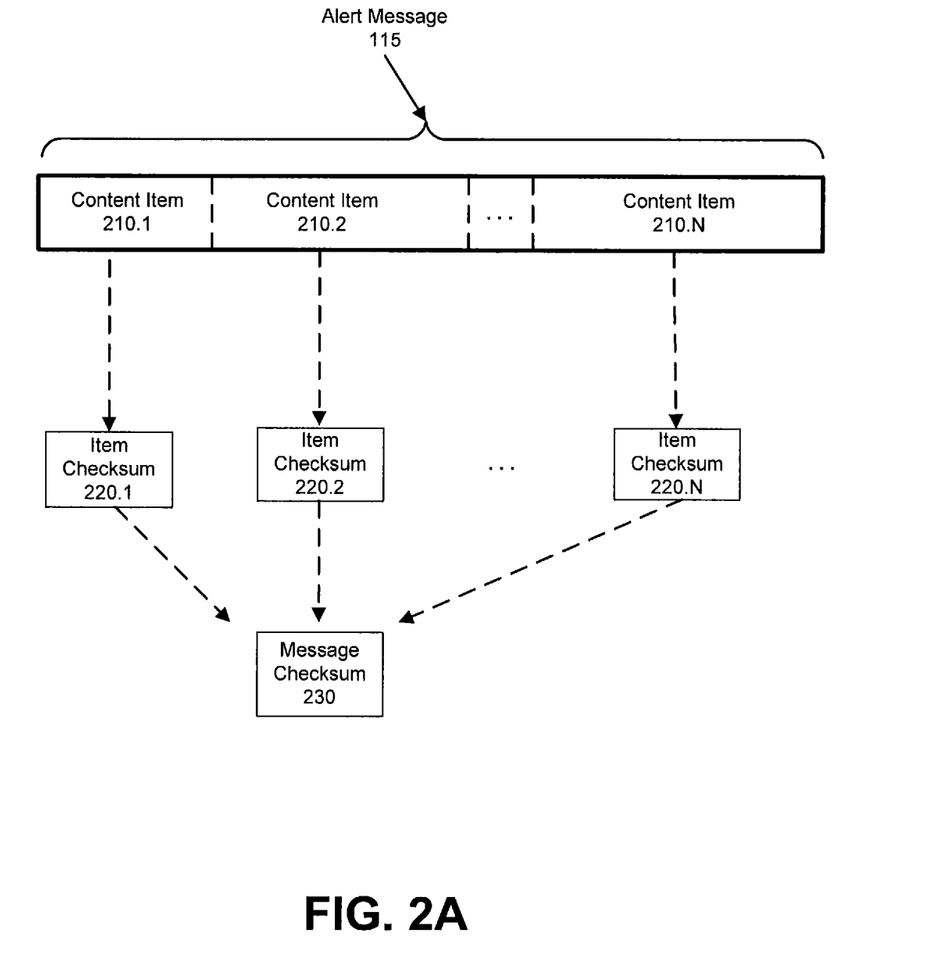
FIG. 2A illustrates an exemplary alert message including alert content.
Figure 2B:
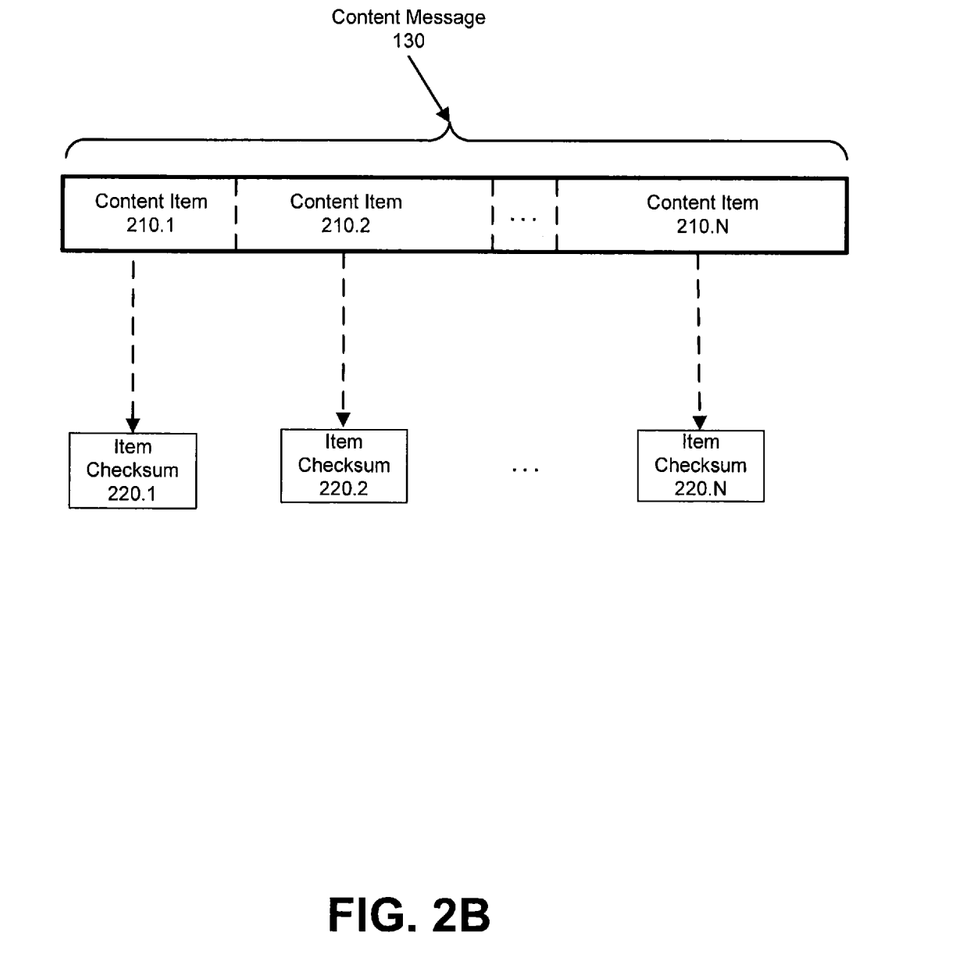
FIG. 2B illustrates an exemplary content message including alert content.

A content history database 140 may be included within the messaging engine 125, or may be part of a separate computing system. Content history database 140 may include database tables allowing for the storage data (including, but not limited to alert messages 115, content messages 130, content history, content items 210 such as multimedia files, item checksums 220, message checksums 230 (discussed below with regard to FIG. 2), rules 145 for the system, alert templates 120, and so on) for use with communications system 100.

Content history database 140 may include one or more relational databases. Alternatively or additionally, content history database 140 may include one or more object-oriented or hierarchical databases, or other mechanisms for storing and accessing data, including arrays, pointers, flat files, etc. As mentioned above, content history database 140 may be included in a separate computing device from messaging engine 125, or may be a software application executing on a same computing device as messaging engine 125.

Data entries may be stored in content history database 140, whereby data entries may be updated, deleted, added, accessed, etc. Individual data entries may be represented by one or more database records included in content history database 140.

In some examples, a checksum may be computed for the entire alert message 115. The checksum may be stored in the content history database 140, and optionally indexed for example by the subscriber device 105 to which the alert message 115 was sent, by subscriber associated with the subscriber device 105, or by subscriber account number. In additional examples, when a content message 130 is received, a checksum for each content file included in the content message 130 may be added to content history database 140. These checksums may be queried for to determine if future alert messages 115 or content messages 130 are duplicates.

Rules 145 may define system behavior with regard to duplicate alert message 115 checking. Rules 145 may define what type of duplicate alert message checking to perform (compare all content in the message, compare only a subset of the content in the message), what algorithm to use for computing a checksum (CRC-32, SHA-1, SHA-2, SHA-256, MD-4, MD-5, AES and the like), on what data to calculate a checksum (such as alert message 115, content message 130, and so on) what steps to take in case a duplicate alert message 115 or content message 130 is found (send the alert message 115, block the alert message 115, reject the content message 130, inform the content provider 150 of the duplicate content message 130) and what steps to take if no duplicate is found.

The rules 145 for the system 100 may be stored in content history database 140, and the currently active rules 145 may also be stored in the messaging engine 125. In other examples, the rules 145 may be stored in the messaging engine 125, in a separate data store, received from a content provider 150, etc.

Rules 145 may describe global system rules to apply to all alert messages 115, or may describe system behaviors that differ for alert messages 115 generated in conformance with different alert templates 120, that differ for alert messages 115 generated from different categories of alert templates 120, and that differ for different subscriber devices 105.

For example, if a received content file extracted from a content message 130 is determined to be a duplicate by the messaging engine 125, the rules 145 may indicate for the messaging engine 125 to send a message to the content provider 150 indicating that duplicate content was sent. This may, for example, inform content provider 150 that there may be an issue with the content messages 130 being sent to the messaging engine 125.

As another example, if an alert message 115 is determined to include a content file that was previously sent in an alert message 115 to the same subscriber device 105, the rules 145 may indicate that the alert message 115 is not to be sent to the subscriber device 105. Such a rule may cause the messaging engine 125 to block duplicate alert messages 115 from being delivered to the subscriber device 105. However, the rules 145 may also cause the messaging engine 125 not to block the duplicate message and instead to cause it to be delivered to the subscriber device 105 even if a duplicate is detected.

Moreover, the rules 145 may differ for different subscriber devices 105, and may vary for different types of content being sent. For example, the rules 145 for a particular subscriber device 105 may be configured to cause the messaging engine 125 to block alert messages 115 including duplicate news stories, but to allow through alert messages 115 including duplicate weather forecast information. Additionally, as the rules 145 may vary by subscriber device 105, the rules 145 for a second subscriber device 105 may indicate that all duplicate alert messages 115 are to be blocked.

Content provider 150, also sometimes known as a Value-Added Service Provider (VASP), is typically a third-party to the communications provider and subscriber. Content provider 150 may provide value-added services to the communications network 110 for use by a subscriber device 105. Content provider 150 may connect may connect to the system 100 through a messaging engine 125 as shown in FIG. 1, or alternately may connect directly to a Short Message Service Center (SMSC) or to an MMSC 135.

The exemplary system 100 may include one or more Content providers 150, although only one is shown in FIG. 1 for simplicity. For example, the system 100 may include different content providers 150 for different categories of content. As an example, the system 100 may include a content provider 150 for Entertainment, another for News, another for Sports, and another Travel & Weather. The system 100 may include multiple content providers 150 for a single category as well, such as multiple content providers 150 for Entertainment content.

Content provider 150 may provide content such as a content message 130 to the messaging engine 125. The content message 130 may include at least one content file, wherein each content file may include an item of information that may be included in an alert message 115. For example, a content file may include a news story on a celebrity, a sports score for a game, a picture of a famous athlete, a picture of a radar chart to include in a weather forecast, a textual weather forecast, etc. A content file may additionally include information regarding how the other content files are to be presented. For example, a content file may include layout information (e.g. SMIL, XHTML, etc.) regarding how other content files in the content message 130 may be incorporated into an alert message 115.

FIG. 2A illustrates an exemplary alert message 115 including content items 210, from which item checksums 220 and a message checksum 230 may be determined. The figure illustrates an exemplary alert message 115 includes 'N' content items 210, an item checksum 220 generated for each content item 210, and a message checksum 230 generated from the 'N' item checksums 220. The item checksum 220 and message checksum 230 values may be used to determine whether an alert message 115 or content message 130 includes a duplicate, or is a duplicate in whole.

Duplicate messages may have various causes. For example, a duplicate alert message 115 may be caused by the system receiving a duplicate content message 130 from a content provider 150. As another example, a duplicate alert message may be caused by a duplicate content file within a content message 130 from content provider 150. Additionally, a duplicate alert message 115 may be caused by a subscriber device 105 signing up to receive the same alert message 115 twice, or a subscriber device signing up for similar alert templates 120, where the alert templates 120 result in an identical or similar alert message 115.

With regard to duplicate content messages 130, a content provider 150 may inadvertently send the same content message 130 to the messaging engine 125 more than once. To detect such a case, messaging engine 125 may compute checksums for each of the content items 210 within the content message 130, and detect whether at least one of the checksums is a duplicate. The messaging engine 125 may further determine whether the entire content message 130 is a duplicate. In addition, messaging engine 125 may inform the content provider 150 that alert messages 115 were not generated from the content message 130 based on the inclusion of duplicate content items within the content message 130.

With regard to duplicate alert messages 115, a subscriber device 105 may sign up for alert templates 120 that may generate duplicative alert messages 115. For example, a subscriber device 105 may sign up for a news alert at 9:00 AM and for a second news alert at noon. The messaging engine 125 may generate the news alert message 115 for the 9:00 AM alert template 120, and calculate item checksums 220 for each content item 210 in the message as well as a message checksum 230 for the entire message. The messaging engine 125 may store the item checksums 220 and message checksum 230 in the content history database 140, and deliver the 9:00 AM alert message 115 to the subscriber device 105. The messaging engine 125 may further generate the news alert message 115 for the noon alert. If there is no additional news to report, then the second alert may include the same content items 210 as the 9:00 AM alert. The messaging engine 125 may calculate a message checksum 230 and/or item checksums 220 for the noon alert message 115, and determine that the noon alert message 115 has the same item checksums 220 and/or message checksum 230 as the 9:00 AM alert, and is thus a duplicate alert message 115.

The messaging engine 125 may detect a duplicate alert message 115 through determining a message checksum 230 based on the alert message 115 to be sent. The message checksum 230 may be determined based on at least one item checksum 220, where each item checksum 220 is in turn determined based on a content item 210 included in alert message 115. The message checksum 230 value may then be compared to a database of message checksum 230 values indicating checksums of messages previously delivered to the subscriber device 105, such as content history database 140. If an alert message 115 with the same message checksum 230 has previously been delivered to the subscriber device 105, then the alert message 115 may be found to be a duplicate alert message 115.

If a duplicate alert message 115 is detected, then the alert message 115 may be blocked or delivered according to relevant rules 145. In addition, the content provider 150 may also be informed that a duplicate alert message 115 was attempted to be sent, if such a notification is specified by the rules 145.

In an example of a duplicate checking system that is configured by rules 145 to determine whether each content item 210 within a message is a duplicate, the messaging engine 125 may determine and block an alert message 115 including any duplicates.

It may not be efficient to compare content files, especially binary files (e.g., image, audio, video, etc.) which may require bit-by-bit comparison to detect duplicate content. Instead, messaging engine 125 may utilizes a checksum or a hash function (e.g. CRC-32, SHA1, MD5) in order to compute a checksum value of a file, and use the checksum value as a content identifier in order to detect duplicate content.

As illustrated in FIG. 2, an alert message 115 may include 'N' content items 210, where 'N' is any positive integer. Although the exemplary alert message 115 in FIG. 2 is shown as including multiple content items 210, it should be noted that an alert message 115 may include any number of content items 210. For example, an alert message 115 may include only one content item 210, while in another example an alert message 115 may include many more content items 210.

An item checksum 220 may be computed for each content item 210 in the alert message 115. For example, item checksum 220.1 may be computed based on content item 210.1, item checksum 220.2 may be computed based on content item 210.2, and so on, through item checksum 220.N, which may be computed based on content item 210.N.

A messaging engine 125 may compute an item checksum 220 for each content item 210 within an alert message 115. The item checksums 220 may be computed using an algorithm such as CRC-32, SHA-1, SHA-2, SHA-256, MD-4, MD-5, AES and the like, or any other hashing or checksum algorithm capable of determining checksum values with an acceptably low number of collisions while also being capable of computation within an acceptable amount of time. The item checksums 220 may be computed based on the entire content item 210, or based on only a portion of the content item 210, such as a predetermined number of bytes. The item checksums 220 may be stored in content history database 140 for comparison with future alert messages 115.

A message checksum 230 may additionally be calculated based on at least one of the item checksums 220. In some examples, the message checksum 230 is computed through a summation of each of the item checksums 220 for the alert message 115. In other examples, only a subset of the item checksums 220 for the alert message is used in determining the message checksum 230. For example, a message checksum 230 may be determined based on the first five item checksums 220, every other item checksum 220, the first and last item checksums 220, and so on.

Other methods instead of a summation may be employed in calculating a message checksum 230 from the at least one item checksum 220. For example, concatenation of item checksums 220 may also be used to generate the message checksum 230, as well as other mathematical operations such as multiplication and division instead of or in addition to a summation of the various item checksum 220 values. In still other examples, computation of a hash or checksum based on the entire alert message 115 may be performed to calculate the message checksum 230.

Once the item checksums 220 and/or message checksum 230 are determined for an alert message 115, the messaging engine 125 may compare determined item checksums 220 and message checksum 230 values with historical checksum values, e.g., stored in a content history database 140. The content history database 140 may include a history table of item checksums 220 as well as message checksum 230 associated with previously sent alert messages 115, such as content files included in previously sent alert messages 115. The item checksums 220 and message checksum 230 values may further be stored in the content history database 140 associated with an identifier of a subscriber or a subscriber device 105.

In some examples, a history table in the content history database 140 may be queried to determine if the alert message 115 includes a duplicate content item 210. In such an example the history table may be queried for some or all of the items checksums 220 determined from the content items 210 in the alert message 115. If a duplicate checksum value is detected, e.g., through a query of the history table in the content history database 140 for an item checksum 220, then the alert message 115 may be determined to include a duplicate file.

In other examples, a duplicate content file checking system may be configured to determine whether an alert message 115 as whole is a duplicate. In such an example, the history table may be is queried for the message checksum 230 determined from the alert message 115. If a match is found, then the alert message 115 may be determined to be a duplicate message. In such a system an alert message 115 may contain an individual content item 210 that is a duplicate, and yet the alert message 115 itself may not be found to be a duplicate.

For example, an alert message 115 in the form of an MMS message may be generated based on an alert template 120 specifying the creation of a horoscope to be sent to a subscriber device 105. The alert message 115 may include three content items 210, namely "horoscope.smil," "horoscope.jpg," and "horoscope.txt." The "horoscope.smil" file may include presentation information describing the layout of the MMS message such as where to place the picture and text items, the "horoscope.jpg" file may be a picture associated with the horoscope, and the "horoscope.txt" file may be text including the horoscope prediction. An item checksum 220 may be determined for each of the three content items 210. Merely by way of example, an item checksum 220 of "2128112939" may be determined for "horoscope.smil," an item checksum 220 of "2618004175" may be determined for "horoscope.jpg," and an item checksum 220 of "3524791200" may be determined for "horoscope.txt."

Additionally, a message checksum 230 may be determined by computing a summation of the three item checksum 220 values included in the alert message 115. For example, the item checksums of "2128112939," "2618004175," and "3524791200" (corresponding to the three content items 210) may be summed together by the messaging engine 125, and thus the messaging engine 125 may compute a message checksum 230 of "8270908314" for the alert message 115.

Each of these item checksum 220 values may then be queried for in a history table in content history database 140. If any of the item checksum 220 values are found in the database, then the horoscope MMS message may be found to be a duplicate message. Moreover, the message checksum 230 may also be queried for in a history table in the content history database 140. If the message checksum 230 is found in the database, then the horoscope MMS message may be found to be a duplicate. Moreover, any item checksum 220 and message checksum 230 values that are not already found in the history table may additionally be inserted into the history table in content history database 140 to be used to verify whether future alert messages 115 are duplicate messages.

FIG. 2B illustrates an exemplary content message 130 including content items 210, from which item checksums 220 may be determined. The figure illustrates an exemplary content message 130 includes 'N' content items 210, as well as item checksums 220 generated for each content item 210. The item checksum 220 values may be computed similar to the item checksum 220 values discussed above with regard to FIG. 2, and may used to determine whether a content message 130 includes duplicate content items 210.

Some content messages 130 may include specific content to be included in only one particular alert message 115 or an alert message 115 conforming to a specific alert template 120. In other examples, a content provider 150 may provide content for a certain category of alert messages 115 and alert templates 120, and the content message 130 may include the current content or an update to the content according to the category of content messages 130 sent from the content provider 150. For example, a content message 130 may include a plurality of content items 210 relating to Entertainment, News, Sports, Travel & Weather, and so on, where the received content items 210 may be used by the messaging engine 125 to create at least one alert message 115 to send to at least one subscriber device 105.

As an example, the content message 130 may include three content items 210, including for example "horoscope.smil," "horoscope.jpg," and "horoscope.txt." Similar to as described above with regard to the alert message 115, an item checksum 220 may be determined for each of the three content items 210. Merely by way of example, an item checksum 220 of "2128112939" may be determined for "horoscope.smil," an item checksum 220 of "2618004175" may be determined for "horoscope.jpg," and an item checksum 220 of "3524791200" may be determined for "horoscope.txt."

Each of these item checksum 220 values may then be queried for in a history table in content history database 140. If any of the item checksum 220 values are found in the database, then the content message 130 may be found to be a duplicate message. In other examples, the content message 130 may not be found to be a duplicate unless all of the content items 210 are found to be duplicates. As discussed above, what conditions constitute a duplicate message and what checksum algorithm to use may be defined by the rules 145.

In some examples, the content items 210 that are found not to be duplicates may be used in the generation of alert messages 115, while the content items 210 that are determined to be duplicates may not be used to generate alert messages 115. In additional examples, the content provider 150 may be informed that duplicate content items 210 have been delivered to the messaging engine 125. As discussed above, whether to inform the content provider 150 that duplicate content items 210 were sent and based on how many duplicates detected may be defined by the rules 145.

For example, the messaging engine 125 may reject the content message 130 and/or notify the content provider 150 according to at least one rule 145. The messaging engine 125 may also store any item checksum 220 values not already in the content history database 140 into the content history database 140, for example in a content history table, for future duplicate content checking.

Figure 3:
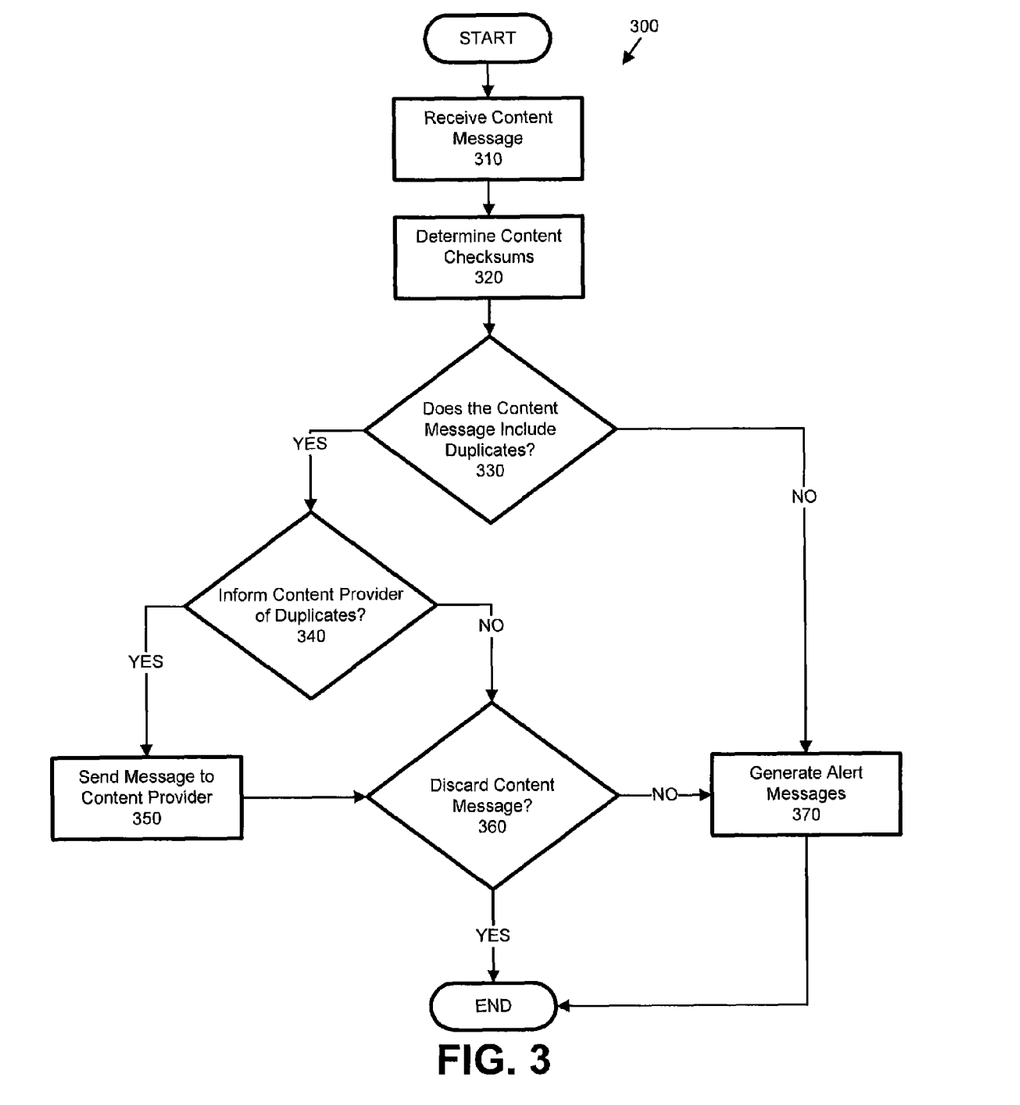
FIG. 3 illustrates an exemplary process flow for determining whether a content message received from a content provider is a duplicate message.

FIG. 3 illustrates an exemplary process flow 300 for determining whether a content message 130 received from a content provider 150 is a duplicate message.

In step 310, a content message 130 may be received by messaging engine 125 from content provider 150. The content message 130 may include at least one content item 210.

Next, in step 320, item checksums 220 may be determined. For example, the messaging engine 125 may determine an item checksum 220 for each content item 210 in the content message 130 received above in step 310. The item checksums 220 may be determined by the messaging engine 125 based on a checksum or hashing algorithm including, but not limited to CRC-32, SHA-1, SHA-2, SHA-256, MD-4, MD-5, and AES. The specific algorithm to use may be specified by the current rules 145, where the current rules 145 may be retrieved from the messaging engine 125 or from a content history database 140.

Next, in step 330, it is determined whether any of the content items 210 are duplicates though use of the item checksums 220 determined above in step 320. For example, the messaging engine 125 may query a history table within a content history database 140 for each of the item checksums 220. If the content history database 140 includes a particular item checksum 220, then the messaging engine 125 may determine that the content item 210 from which the item checksum 220 was calculated is a duplicate content item 210. If the content message 130 contains duplicates, step 340 is executed next. Otherwise, step 370 is executed next.

Next, in step 340, it may be determined whether to inform the content provider 150 that the content message 130 includes duplicates. For example, the messaging engine 125 may determine based on the rules 145 whether the content provider 150 from which the content message 130 originated should be informed that the content message 130 may have been discarded due to containing duplicate content items 210. The content providers 150 may wish to be notified so that it may, for example, perform diagnostics or otherwise determine the cause of duplicate content message 130 being sent to the messaging engine 125. In other examples, the rules 145 may indicate that no notification to the content provider 150 is required. If a message is to be sent to the content provider 150, step 350 is executed next. Otherwise, step 360 is executed next.

In step 350, a message is sent to the content provider 150 indicating that the content message 130 included duplicate content items 210. The message may further indicate whether the content message 130 was discarded as a result of including duplicate content. Next, step 360 is executed.

In step 360, it is determined whether to discard the content message 130. The messaging engine 125 may determine whether to discard the content message 130 based on whether the content message 130 includes duplicate content items 210 as determined above in step 330, while taking into account the current rules 145. For example, the rules 145 may indicate that a content message 130 including only one duplicate content item 210 may cause the entire content message 130 to be discarded. In other examples, the rules 145 may indicate that a content message 130 is to be discarded only in all of the included content items 210 are duplicates, or if a certain threshold amount of content items 210 or percentage of content items 210 are duplicates. In many examples, if none of the content items 210 are duplicates, then the content message 130 is not discarded and is used by the messaging engine 125.

The rules 145 may further use different rules depending on the type of content included in the content message 130. For example, duplicate content in a content message 130 including weather information may be allowed and cause a message not to be discarded even if all of the content items 210 are duplicates, while duplicate content in a content message 130 including news stories may be discarded if the news content items 210 are duplicates. If the messaging engine 125 determined to discard the content message, the process 300 ends. Otherwise, step 370 is executed next.

In step 370, alert messages 115 are generated based on the content message 130. Generating alert messages 115 based on the content message 130 is described in more detail in FIG. 4. Next, the process 300 ends.

Figure 4:
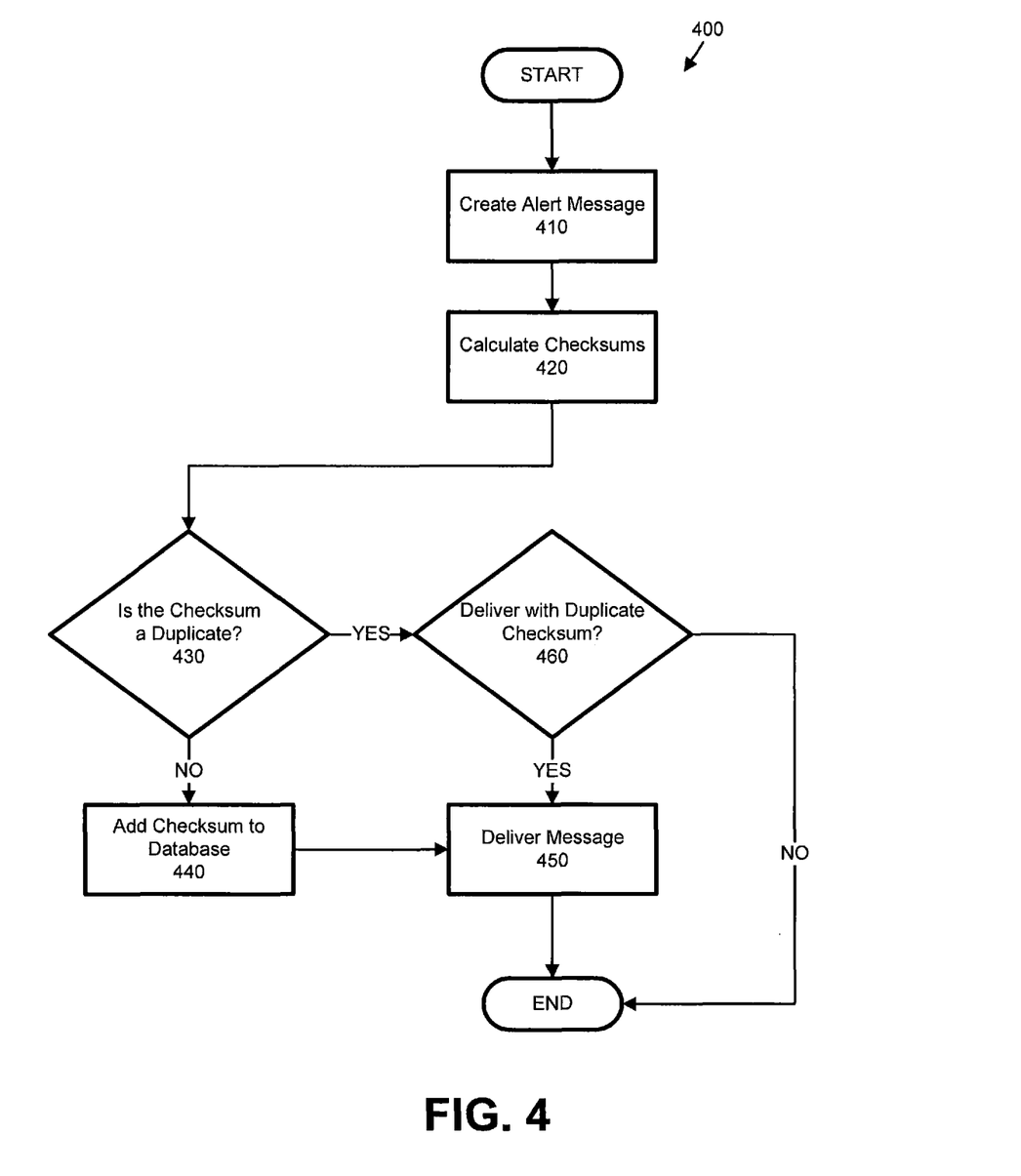
FIG. 4 illustrates an exemplary process flow for determining whether to deliver an alert message based on whether the message is a duplicate.

FIG. 4 illustrates an exemplary process flow 400 for determining whether to deliver an alert message 115 based on whether the alert message 115 is a duplicate.

In step 410, an alert message 115 may be generated based on an alert template 120. The alert message 115 may be generated by the messaging engine 125 based on an alert template 120 associated with a subscriber device 105 and may include at least one content item 210 received in at least one content message 130 from at least one content provider 150. As discussed above, an alert template 120 may include a trigger condition, and the alert message 115 may be generated based on the triggering of the alert condition trigger. Additionally, the messaging engine 125 may compare the at least one content item 210 with subscription information for a subscriber device 105, and any alert templates 120 the subscriber device 105 is signed up for along with any rules 145 for the system. The content items 210 may include metadata that may be matched with the alert templates 120 and/or with the subscriber device 105, and if matching content items 210 are found, then the messaging engine 125 may generate an alert message 115 based on the matching content items 210.

For example, if an alert template 120 indicates that a news alert message 115 is to be generated at 9:00 AM daily, then when the time becomes 9:00 AM, the messaging engine 125 may generate the alert message 115 including news stories as specified by the alert template 120.

Next, in step 420, checksums for the alert message 115 may be calculated. For example, the messaging engine 125 may calculate item checksums 220 based on each content item 210 included in the alert message 115. In some examples, the content item 210 checksums that were computed upon receipt of a content message 130 may be stored in the content history database 140 and retrieved instead of being re-calculated again. Moreover, a message checksum 230 may further be calculated for the alert message 115, for example based on at least one of the item checksums 220 included in the alert message 115 or by another method as described above. The algorithm to use in generating the item checksums 220 and message checksum 230 may be specified by the current rules 145, which may be retrieved from the messaging engine 125 or from the content history database 140, as required.

Next, in step 430, it may be determined whether the alert message 115 is a duplicate message. In some examples, the messaging engine 125 may consider an alert message 115 to be a duplicate if it includes at least one content item 210 included in another alert message 115 to the same subscriber device 105 or to another subscriber device 105 associated with the same subscriber. In other examples, the messaging engine 125 may not consider an alert message 115 to be a duplicate unless all of the content items 210 are duplicates, or if at least a threshold number or percentage of the content items 210 are duplicates. The algorithm or threshold used by the messaging engine 125 in determining whether an alert message 115 is a duplicate may be defined by the rules 145, which may be retrieved from the messaging engine 125 or from the content history database 140, as required. If the alert message 115 is determined to be a duplicate, the step 460 is executed next. Otherwise, step 440 is executed next.

In step 440, the checksums are added to the content history database 140. For example, the messaging engine 125 may add the message checksum 230 to a content history table in the content history database 140. The messaging engine 125 may additionally add any of the at least one item checksum 220 that are not already included in the content history database 140 into a content history table in the content history database 140. In other examples, the item checksums 220 and message checksum 230 may be added to a content history table in the content history database 140 at the time the checksums are determined, for example, such as above in step 420.

Next, in step 450, the alert message 115 may be delivered to the subscriber device 105. Next, the process 400 ends.

In step 460, it may be determined whether to deliver the alert message 115 although the message does include duplicate content items 210, or is a completely duplicated message. If the alert message 115 is to be delivered even though it includes duplicates, then step 450 is executed next. Otherwise, the process 400 ends.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
    receiving a content message from a content provider at a computing device, the content message including at least one content item to be included in alert messages;
    verifying a content item included in the content message for duplication against a content history by utilizing the computing device, the content history including checksums of content items from at least one other content message received from the content provider, the verifying including:
    computing an item checksum for the content item;
    querying the content history for the item checksum; and
    determining whether the item checksum is a duplicate based on a result returned from the query; and
    determining, based at least in part on whether the content item is determined to be a duplicate, whether to generate alert messages using the content message, the generating including:
    matching the content item to an alert template associated with a subscriber, and
    generating an alert message including the content item based on the alert template.

2. The method of claim 1, further comprising adding the item checksum to the content history if the item checksum is not found in the content history.

3. The method of claim 1, wherein the item checksum is computed from the content item using an algorithm including at least one of CRC-32, SHA-1, SHA-2, SHA-256, MD-4, MD-5, and AES.

4. The method of claim 1, further comprising notifying the content provider of a duplicate if at least one content item in the content message is determined to be a duplicate.

5. The method of claim 1, further comprising:
    sending the alert message to at least one subscriber device associated with the alert template.

6. A method, comprising:
    associating an alert template with a subscriber device;
    matching by utilizing a computing device, at least one content item from a content message received from a content provider to the alert template;
    generating by utilizing the computing device, an alert message for the alert template based on the at least one content item;
    verifying by utilizing the computing device, the at least one content item included in the alert message for duplication against a content history, the content history including checksums of alert messages generated from at least one other content message received from the content provider, the verifying including:
    calculating at least one item checksum;
    querying the content history for the at least one item checksum; and
    determining whether the at least one item checksum is a duplicate based on a result returned from the query; and
    selectively sending the alert message to the subscriber device based on the verification.

7. The method of claim 6, wherein selectively sending the alert message comprises:
    determining a category of information associated with the alert template from which the alert message is generated;
    retrieving a rule determining how to proceed when potentially sending duplicate alert messages in the category of information; and
    determining whether to send the alert message based on the rule if the alert message is determined to be a duplicate.

8. The method of claim 6, further comprising adding the at least one item checksum to the content history.

9. The method of claim 6, further comprising:
    computing a message checksum based on a plurality of the at least one item checksums;
    querying the content history for the message checksum; and
    determining whether the alert message is a duplicate based on a result of the query.

10. The method of claim 9, further comprising calculating the message checksum as a summation of a plurality of the at least one item checksums.

11. The method of claim 9, further comprising adding the message checksum to the content history.

12. The method of claim 6, wherein selectively sending the alert message comprises sending the alert message if none of the content items in the alert message are determined to be duplicate.

13. The method of claim 6, wherein selectively sending the alert message comprises sending the alert message if at least one of the content item in the alert message is determined not to be duplicate.

14. A system, comprising:
a content provider connected to a communications network and configured to send content messages to a messaging engine;
a data store connected to the communications network and configured to maintain a content history database; and
a messaging engine computing device connected to the communications network and configured to:
receive a content message from a content provider, wherein the content message includes at least one content item;
verify the at least one content item included in the content message for duplication against the content history database, the content history database including checksums of content items from at least one other content message received from the content provider, the verifying including to:
compute an item checksum for the content item;
query the content history database for the item checksum; and
determine whether the item checksum is a duplicate based on a result returned from the query;
match at least one content item in the content message that is determined not to be a duplicate to an alert template; and
generate an alert message for the alert template based on the at least one content item that is determined not to be a duplicate.

15. The system of claim 14, wherein the data store is further configured to add the item checksum to the content history database if the item checksum is not found in the content history.

16. The system of claim 14, wherein the messaging engine is further configured to inform the content provider if the content message includes a duplicate content item.

17. The system of claim 14, wherein the messaging engine is further configured to discard the content message if the content message includes a duplicate content item.

18. The system of claim 14, wherein the data store is further configured to maintain a plurality of alert templates, wherein each alert template comprises a definition of information to be included in an alert message and an alert trigger.

19. The system of claim 18, further comprising a plurality of subscriber devices communicatively coupled to the communications network,
wherein the data store is further configured to maintain a plurality of associations of alert templates to subscriber devices.

20. The system of claim 19, wherein the data store is further configured to maintain a category associated with each alert template, wherein the messaging engine is further configured to:
determine a category associated with the alert message; and
determine whether to send the alert message based on a rule for the category and whether the alert message is determined to be a duplicate.

21. The system of claim 19, wherein the subscriber device is further configured to send a request to the messaging engine to subscribe to an alert template, and the messaging engine is further configured to receive the request and add the alert template to the plurality of associations of alert templates to subscriber devices in the data store.

22. The system of claim 19, wherein the messaging engine is further configured to send the generated alert message to a subscriber device associated with the alert template.

* * * * *